US006314395B1

(12) United States Patent
Chen

(10) Patent No.: US 6,314,395 B1
(45) Date of Patent: Nov. 6, 2001

(54) VOICE DETECTION APPARATUS AND METHOD

(75) Inventor: Wen-Yuan Chen, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/172,416

(22) Filed: Oct. 14, 1998

(30) Foreign Application Priority Data

Oct. 16, 1997 (TW) ........................................ 86115188

(51) Int. Cl.[7] ........................................ G10L 15/20
(52) U.S. Cl. ........................ 704/233; 704/228; 704/226
(58) Field of Search ........................ 704/233, 228, 704/248, 208, 214, 270, 275, 246, 226, 227, 253, 251, 250, 247

(56) References Cited

U.S. PATENT DOCUMENTS

| | | | | |
|---|---|---|---|---|
| 4,833,713 | * | 5/1989 | Muroi et al. | 704/247 |
| 5,596,680 | * | 1/1997 | Chow et al. | 704/248 |
| 5,659,622 | * | 8/1997 | Ashley | 704/233 |
| 5,692,104 | * | 11/1997 | Chow et al. | 704/253 |
| 5,732,394 | * | 3/1998 | Nakadai et al. | 704/255 |

OTHER PUBLICATIONS

Bentelli et al., ("A multichannel speech/silence detector based on time delay estimation and Fuzzy classification", ICASSP'99, vol. 1, Mar. 1999, pp. 93–96).*

Haigh et al., ("Robust voice activity detection using Cepstral features", TENCON'93., 1993 Region 10 Conference on Computer, Communication, Control and Power engineering Proceedings, Oct. 1993, vol. 3, pp. 321–324).*

* cited by examiner

*Primary Examiner*—William Korzuch
*Assistant Examiner*—Vijay B Chawan
(74) *Attorney, Agent, or Firm*—Jiawei Huang; J. C. Patents

(57) ABSTRACT

A voice detection method and apparatus is provided, which can detect whether a received signal is a voice signal or a background noise. By the method and apparatus, the voice detection need not to perform multiplications and divisions. Moreover, the voice detection method and apparatus can encode the sampled data into 8-bit format but nonetheless obtain good detection result. Further, the voice detection method and apparatus can prevent overflow and allow for easy refreshing of the preset threshold of background noise. These benefits allow the hardware circuitry that implements the voice detection method and apparatus to be significantly simplified in complexity, and thus significantly reduced in manufacturing cost.

14 Claims, 3 Drawing Sheets

VOICE DETECTION APPARATUS AND METHOD

CROSS-REFERENCE TO RELATED APPLICATION

This application claims the priority benefit of Taiwan application serial no. 86115188, filed Oct. 16, 1997, the full disclosure of which is incorporated herein by reference.

BACKGROUND OF THE INVENTION

1. Field of the Invention

This invention relates to voice signal processing techniques, and more particularly, to a voice detection method and apparatus which can detect whether a received signal is a voice signal or a background noise. In the invention, the voice detection does not to perform multiplications and divisions so that the hardware complexity and cost for implementation can be significantly reduced.

2. Description of Related Art

Voice detection is a signal processing technique used to determine whether a received signal is a voice signal or a background noise and if a voice signal is detected, the begin point and the end point of the voice signal is determined. One conventional method to achieve this purpose is to compare the mean and standard deviation of the energy of the received signal and also the zero-crossing rate of the same with preset values. The comparison result then indicates whether the received signal is a voice signal or a background noise; and if a voice signal, the begin point and end point of the voice signal are also determined.

Fundamentally, the energy of a voice signal can be obtained from the following equation:

$$E(i) = SQRT\left\{\left[\sum_{n=0}^{n=M-1} X(n)\times X(n)\right]\div M\right\} \quad \text{(A1)}$$

where

E(i) is the energy of the (i)th frame of the digitized voice signal;

SQRT is a square-root operator;

M is the total number of sampling points in each frame; and

X(n) is the digitized data from the (n)th sampling point in the (i)th frame.

The foregoing equation is too complex to perform. The following less complex equation can be used instead to compute for E(i):

$$E(i) = \left[\sum_{n=0}^{n=M-1} |X(n)|\right]\div M \quad \text{(A2)}$$

Therefore, it requires M-1 additions and one division to perform the operation of Eq. (A2) to obtain the value of E(i). In the case of using a sampling frequency of 8 kHz (sampling period=0.125 ms) to digitize the voice signal into 8-bit digital signal, then M=160 for a frame length of 20 ms, which requires 159 additions and one division to obtain the value of E(i). The hardware needed to perform this operation is therefore quite complex. Moreover, in order to prevent overflow, an accumulator of a large bit length should be used. This further increase the complexity of the hardware needed to implement the conventional voice detection method.

To make the products of voice detection apparatuses more competitive on the market, the manufacturing cost should be down. One conventional voice detection method and apparatus utilizes an accumulator of a large bit length and a preemphasis circuit that involves multiplication operations. This voice detection apparatus is therefore quite complex in hardware architecture and thus high in manufacturing cost. Another conventional voice detection method and apparatus utilizes a cascaded series of registers to implement the large bit-length accumulator. One drawback to this scheme, however, is that it would cause a degrade to the system performance and throughput and an increased degree of complexity in programming. There exists, therefore, a need for a new voice detection method and apparatus, which can be implemented with less complex hardware circuitry.

SUMMARY OF THE INVENTION

It is therefore an objective of the present invention to provide a voice detection method and apparatus which performs no complex multiplications and divisions and uses 8-bit registers but can nonetheless provide good voice detection result and prevent overflow of data during computation.

It is another an objective of the present invention to provide a voice detection method and apparatus which is less complex in hardware architecture compared to the prior art, so that manufacturing cost can be reduced.

It is still another objective of the present invention to provide a voice detection method and apparatus which allows easy refreshing of the preset threshold of background noise.

In accordance with the foregoing and other objectives of the present invention, a voice detection method and apparatus is provided. The voice detection method and apparatus is used in particular to detect whether a received analog signal is a voice signal.

By the voice detection method of the invention, the initial steps are to digitize the received analog signal into digital form, and then preemphasize the digital form of the received analog signal so as to intensify the high-frequency components of the voice signal that can be attenuated during transmission through the air. A preemphasized digital signal is thus obtained, which is then divided into a plurality of frames, each frame containing a specific number of sampling points of data.

The subsequent steps are to count for the total number of occurrences of each of the absolute discrete amplitude levels in each of the frames in the preemphasized digital signal, and then find the majority magnitude of each of the frames in preemphasized digital signal.

Subsequently, the majority magnitude of each of the frames is compared with a preset threshold of background noise in a following manner. If a predetermined number of consecutive frames are all greater in majority magnitude than the threshold of background noise, then a begin/end signal is switched to an enable state. Otherwise, the begin/end signal is maintained at a disable state.

If the predetermined number of consecutive frames is not all greater in majority magnitude than the threshold of background noise, then a threshold refreshing procedure is performed. Otherwise, after begin/end signal is switched to the enable state, the subsequent steps are to pause for a period of a specific number of frames, and then compare the majority magnitude of each of subsequently received frames with the preset threshold of background noise in a following manner. If a predetermined number of consecutive frames are not all greater in majority magnitude than the threshold of background noise, then the begin/end signal is switched to the disable state. Otherwise, the begin/end signal is maintained at the enable state.

The above-described voice detection method can be used for detecting the begin point and end point of a voice signal, which needs no complex multiplication and divisions as in the prior art to perform the computations for the voice detection.

According to the above-described voice detection method, the high-frequency and low-amplitude components of the voice signal can be preemphasized, so as to prevent the loss of fidelity of the voice signal. The preemphasized signal is then processed by the majority-magnitude detecting circuit to obtain the majority magnitude of each of the frames in the voice signal. This allows the overall voice detection method to be reduced in hardware complexity.

In the foregoing method, the preemphasizing is performed in accordance with the equation:

$$y(n)=x(n)-\alpha\cdot x(n=1)$$

where y(n) is the (n)th output preemphasized digital signal, x(n) is the sampled digital data from the (n)th sampling point; and α is a predetermined preemphasizeer factor.

Further, the threshold refreshing procedure is performed in accordance with the equation to obtain a refreshed new threshold of background noise:

New_Threshold=Old_Threshold+b×(Majority_Magnitude−Old_Threshold)

where

New_Threshold is the refreshed new threshold of background noise; Old_Threshold is the previously set threshold of background noise; Majority_Magnitude is the majority magnitude of the currently received frame; and b is a predetermined constant.

The invention further provides a voice detection apparatus for detecting whether a digital signal converted from an analog input is a voice signal. The voice detection apparatus of the invention includes a preemphasis circuit, a majority-magnitude detecting circuit, a begin/end-points detecting circuit.

The preemphasis circuit is used for preemphasizing the digital signal to thereby obtain a preemphasized digital signal. The preemphasized digital signal is divided into a plurality of frames, wherein each of the frames contains a specific number of sampling points of data. The majority-magnitude detecting circuit, coupled to received the preemphasized digital signal from the preemphasis circuit, is used for finding the majority magnitude of each of the frames in the preemphasized digital signal. The begin/end-points detecting circuit, coupled to the majority-magnitude detecting circuit, is capable of comparing the majority magnitude of each of the frames with a preset threshold of background noise in a following manner. If a predetermined number of consecutive frames are not all greater in majority magnitude than the threshold of background noise, then the begin/end-points detecting circuit maintains a begin/end signal at a disable state.

Otherwise, the begin/end-points detecting circuit switches the begin/end signal to an enable state. Then the majority magnitude of each of subsequently received frames is compared with the preset threshold of background noise in a following manner. If a predetermined number of consecutive frames are not all greater in majority magnitude than the threshold of background noise, then the begin/end-points detecting circuit switches the begin/end signal to the disable state. Otherwise, the begin/end-points detecting circuit maintains the begin/end signal at the enable state.

The above-described voice detection apparatus can be used for detecting the begin point and end point of a voice signal. In particular, the voice detection apparatus of the invention needs no complex multiplication and divisions as in the prior art to perform the computations for the voice detection.

The voice detection apparatus further includes a low-pass filter and an analog-to-digital converter. The low-pass filter with a specific cutoff frequency is used for filtering out all frequency components of the analog input beyond the voice frequency range. The analog-to-digital converter, coupled to the low-pass filter, is used for converting the output of the low-pass filter into digital form.

In the foregoing voice detection apparatus, the preemphasis circuit includes a delay circuit, an subtracter, a shifter and an adder. The delay circuit is used for delaying each digitized sample of data by one unit. The subtracter is used for subtracting delayed version of each digitized sample of data from the undelayed version of the same. The shifter is used for shifting the bits of the output of the delay circuit by a predetermined number of bits. The adder is used for summing up the output of the subtracter and the output of the adder to thereby obtain the preemphasized digital signal.

Since the voice detection apparatus of the invention needs only to count for the majority magnitude with only an adder, a subtracter, and a shifter, the hardware complexity is significantly reduced compared to the prior art. Moreover, the simplified preemphasis circuit and refreshing procedure for the threshold of background noise can further reduce the hardware complexity, and thus manufacturing cost, of the voice detection apparatus.

Another advantage of the invention is that the preemphasis circuit can preemphasize the high-frequency and low-amplitude components of the voice signal so as to prevent the loss of fidelity of the voice signal. The preemphasized signal is then processed by the majority-magnitude detecting circuit to obtain the majority magnitude of each of the frames of the voice signal. The simplified architecture of the majority-magnitude detecting circuit allows the overall voice detection apparatus to be reduced in hardware cost.

BRIEF DESCRIPTION OF THE DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
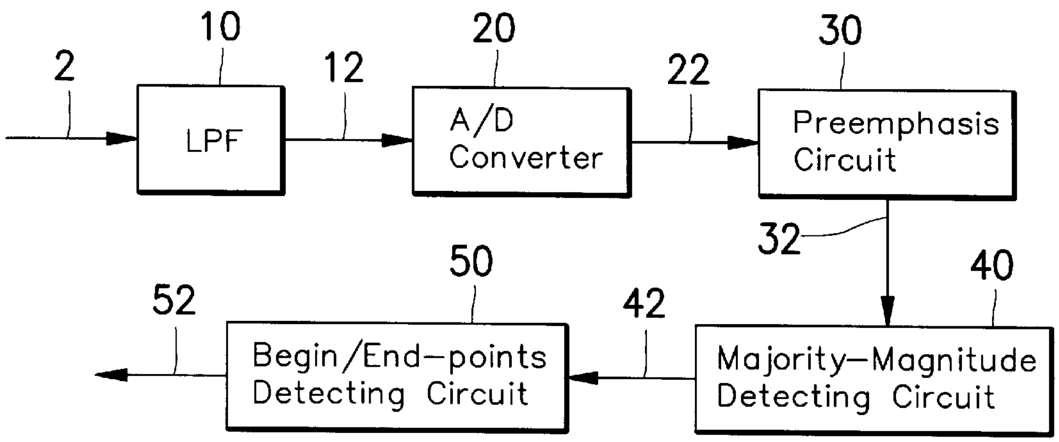
FIG. 1 is a schematic block diagram of a hardware implementation of the voice detection method and apparatus according to the invention.

FIG. 1 is a schematic block diagram of a hardware implementation of the voice detection method and apparatus according to the invention. This voice detection method and apparatus is used to detect whether a received signal 2 is a voice signal or a background noise. As shown, the voice detection apparatus includes a low-pass filter (LPF) 10, an analog-to-digital (A/D) converter 20, a preemphasis circuit 30, a majority-magnitude detecting circuit 40, and a begin/end-points detecting circuit 50.

The received signal 2 input to this voice detection apparatus is analog in form and is usually generated by a microphone or a voice extraction device. The received signal 2 is first filtered by the LPF 10 which has a cutoff frequency of 3,500 Hz to filter out all the frequencies beyond the audible sound range. The output signal 12 from the LPF 10 is then transferred to the A/D converter 20 where it is converted into digital form. In this embodiment, for example, the A/D converter 20 uses a predetermined sampling frequency of 8 kHz to sample the filtered analog signal into an 8-bit digital signal 22. The output digital signal 22 from the A/D converter 20 is then transferred to the preemphasis circuit 30.

Since the high-frequency and low-amplitude components of voice signal would be easily attenuated during transmission, the preemphasis circuit 30 is provided to intensify the output digital signal 22 from the A/D converter 20 in a manner as follows:

$$y(n)=x(n)-\alpha\cdot x(n+1) \text{ for } n=1 \text{ to } M \tag{B1}$$

where y(n) is the (n)th preemphasized signal;

x(n) is the (n)th output digital signal 22 from the A/D converter 20; and α is a predetermined preemphasizeer factor.

In the preferred embodiment, for example, the preemphasizeer factor is set to 31/32. In this case, Eq. (B1) is reduced to:

$$y(n)=x(n)-(31/32)\cdot x(n-1)=x(n)-x(n-1)+x(n-1)/32 \tag{B2}$$

Detailed inside structure of the preemphasis circuit 30 will be described later in this section with reference to FIG. 2.

The preemphasized digital signal (designated by the reference numeral 32 in FIG. 1) from the preemphasis circuit 30 is then transferred to the majority-magnitude detecting circuit 40 where the preemphasized digital signal 32 is divided into a plurality of frames. For a sampling frequency of 8 kHz, assume a frame length of 20 ms is used, then each frame contains 160 sampling points of data (i.e., M=160). The majority-magnitude detecting circuit 40 then detect the majority magnitude of each of the frames in the preemphasized digital signal 32. The majority magnitude of a frame is defined as the predominate one of the possible absolute discrete amplitude levels that the majority of the sampling points in that frame possess.

For example, in the case of 8-bit digitization, the amplitude is digitally quantized into $2^8$=256 discrete levels. Each sampling point takes one of these 256 discrete amplitude levels. Therefore, y(n) takes one of 256 possible values (i.e., the quantized amplitude levels). The absolute value of y(n), expressed as |y(n)|, takes one of 128 possible values (i.e., absolute discrete amplitude levels).

In the case of using a sampling frequency of 8 kHz with M=160, for example, if a certain frame contains a total of 50 sampling points with the 10th absolute discrete amplitude level, a total of 30 sampling points with 15th absolute discrete amplitude level, a total of 5 sampling points with the 18th absolute discrete amplitude level, then the majority magnitude of this frame is the 10th absolute discrete amplitude level (i.e., in this case, majority magnitude=10).

The majority-magnitude detecting circuit 40 detects the majority magnitude of each of the frame in the preemphasized digital signal 32 from the preemphasis circuit 30, and then sends out a majority-magnitude signal 42 indicating the detected result to the begin/end-points detecting circuit 50. The begin/end-points detecting circuit 50 is preset with a threshold of background noise, for example the 20 (representing the 20th absolute discrete amplitude level). The majority magnitude of each frame is compared with this threshold of background noise to determine whether the digital data in this frame is noise or a part of the voice signal.

If a predetermined number of consecutive frames, for example three consecutive frames, are detected to have their majority magnitudes exceeding the threshold of background noise, the begin/end-points detecting circuit 50 will conclude that the received signal 2 is a voice signal, thus switching the begin/end signal on the signal line 52 to an enable state, for example a high-voltage state.

Otherwise, the begin/end-points detecting circuit 50 will conclude that the received signal 2 is a background noise, thus performing a threshold refreshing procedure in accordance with the following equation:

$$\begin{aligned} \text{New\_Threshold} &= (\text{Old\_Threshold} * 31 + \text{Majority\_Magnitude})/32 \\ &= (\text{Old\_Threshold} * 32 - \text{Old\_Threshold} + \text{Majority\_Magnitude})/ \\ &= \text{Old\_Threshold} + (\text{Majority\_Magnitude} - \text{Old\_Threshold}))/32 \end{aligned} \tag{B3}$$

where

New_Threshold is the refreshed new threshold of background noise;

Old_Threshold is the previously set threshold of background noise;

Majority_Magnitude is the majority magnitude of the currently received frame; and assuming that each voice signal will last for at least a continuous length, for example 300 ms, then the majority-magnitude detecting circuit 40 can be devised to pause for a corresponding duration after the begin point is detected. In the case of the voice length 300 ms, the majority-magnitude detecting circuit 40 starts to detect the end point of the voice signal after receiving 10 frames. Similar to the detection of the begin point, the begin/end-points detecting circuit 50 will conclude that the voice signal has reached its end point when the majority magnitudes of a predetermined number of consecutive frames (for example three) are all less than the threshold of background noise. When this is the case, the begin/end-points detecting circuit 50 will switch the begin/end signal on the signal line 52 to a disable state, for example a low-voltage state.

Figure 2:
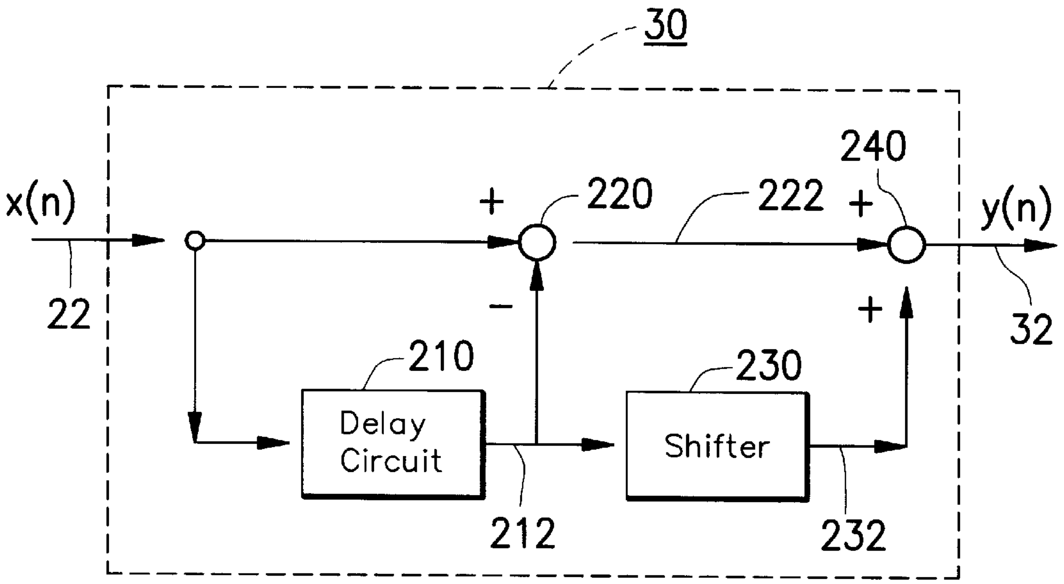
FIG. 2 is a schematic block diagram showing the inside structure of a preemphasis circuit utilized in the voice detection method and apparatus of FIG. 1.

FIG. 2 is a schematic block diagram showing the inside structure of the preemphasis circuit 30 utilized in the voice detection apparatus of FIG. 1. As shown, the preemphasis circuit 30 includes a delay circuit 210, a subtracter 220, a shifter 230, and an adder 240. The preemphasis circuit 30 is specifically designed to perform the arithmetic operation of the foregoing Eq. (B2), i.e., y n) =x (n) −x (n+1)+x (n−1)/32 for each n in the current frame. The delay circuit 210 delays the received signal x(n) by one unit to thereby obtain x(n−1) which is then sent via the signal line 212 to both the subtracter 220 and the shifter 230. The subtracter 220 then perform the subtraction x(n)−x(n−1) which is then transferred via the signal line 222 to the adder 240. Meanwhile, the shifter 230 shifts the bits of x(n−1) to the right by five bits to thereby obtain x(n−1)/32. Subsequently, the output of the subtracter 220 and the output of the shifter 230 are summed up by the adder 240 to thereby obtain y(n). It is an apparent advantage of this preemphasis circuit 30 that y(n) can be obtained simply through delay, subtraction, bit shift, and addition, without the need to perform multiplications or divisions as in the prior art, so that the hardware complexity thereof can be significantly simplified to save manufacturing cost.

In the foregoing preferred embodiment, the sampled data are 8-bit coded. However, it is apparent to those skilled in the art that other bit number is possible. A large bit number for each piece of sampled data is undoubtedly better in precision, but it will also increase hardware complexity and thus manufacturing cost.

Figure 3:
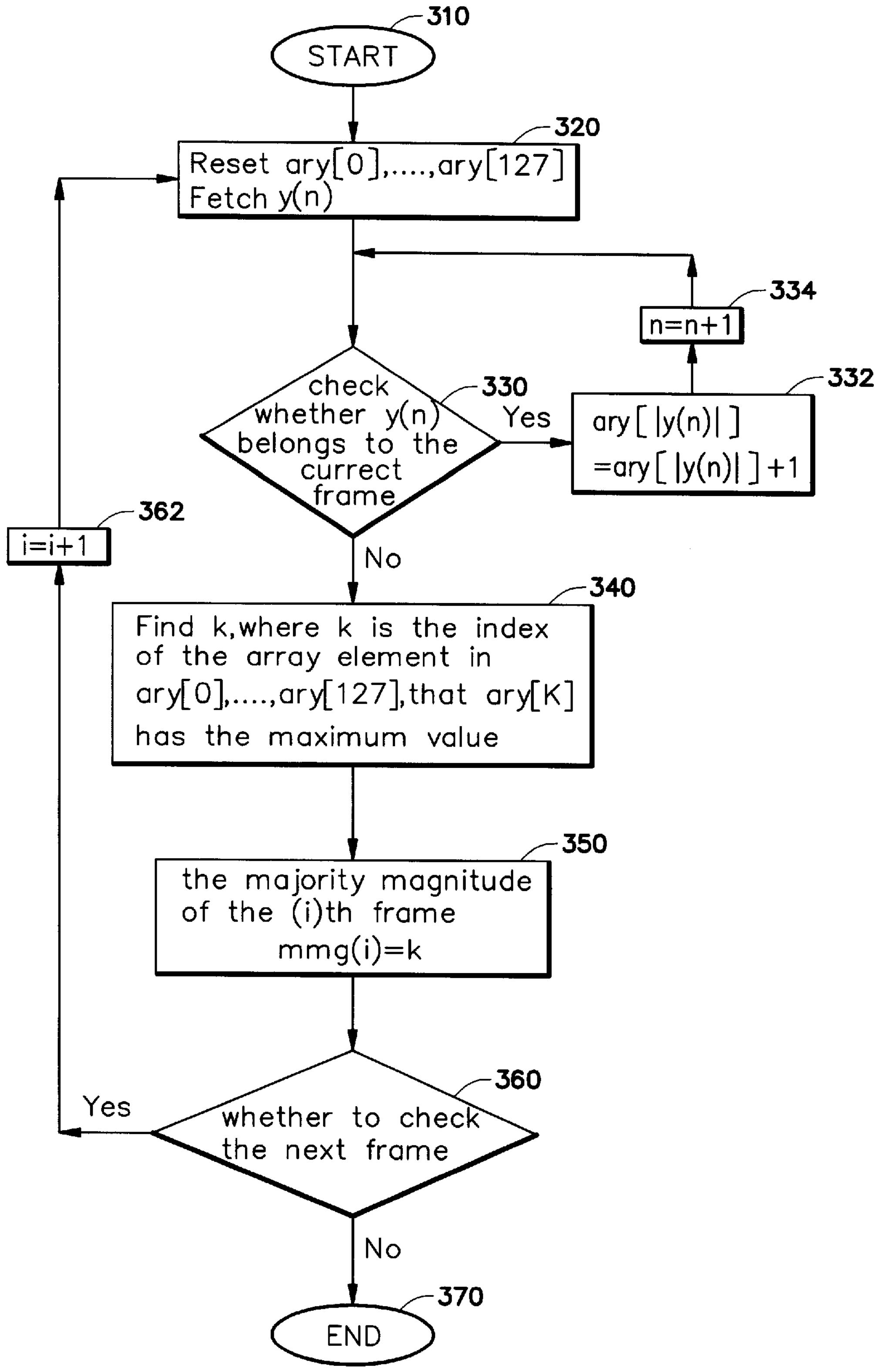
FIG. 3 is a flow diagram showing the procedural steps involved in a majority-magnitude finding procedure for finding the majority magnitude of each frame in the digitized and preemphasized voice signal.

FIG. 3 is a flow diagram showing the procedural steps of the computation performed by the majority-magnitude detecting circuit 40 to find the majority magnitude of each of the frames in the preemphasized digital signal 32 from the preemphasis circuit 30.

In the initial step 310, the majority-magnitude finding procedure is started. In the subsequent step 320, the array ary[i], for i=0 to 127 are reset to 0, and y(n), n=0 to M are received. The subsequent step 330 then checks whether y(n) belongs to the current frame; if yes, the procedure goes to step 332, in which the following arithmetic operation $$\mathrm{ary}[|y(n)|]=\mathrm{ary}[|y(n)|]+1$$

is performed. The foregoing operation means that if the received y(n) has a quantized amplitude at the (x)th level, where $0 \leqq x \leqq 127$ since |y(n)| can take one of 128 possible values as mentioned earlier, then count ary[|y(n)|] (i.e., ary[x]) is increased by one. In the subsequent step 334, the operation n=n+1 is perform, and then the procedure goes back to step 330. This iteration continues until all y(n), n=0 to M in the current frame are processed.

The procedure then goes to step 340 in which the majority magnitude k is determined, k being the index of the array element in the array ary[i], for i=0 to 127 that has the maximum value. For example, in the case ary[10]=5, ary [22]=10, ary[120]=20, and ary[i]=0, for all other i, then since MAX {ary[0], ary[1], ary[2], . . . , ary[127]}=ary[120]=20, it is determined that k=120, which means that the majority of the absolute discrete amplitude levels of the sampling points in the current frame is at the 120th level. In the subsequent step 350, the assignment mmg(i)=k is perform, where mmg(i)=k represents the majority magnitude of the current (i)th frame.

The subsequent step 360 is to judge whether the next frame is to be processed. If yes, the procedure goes to step 362, in which the operation i=i+1 is performed; then the procedure goes to step 320 to process the next (i+1)th frame. Otherwise, if not, the procedure goes to the step 370 to terminate the procedure.

Figure 4:
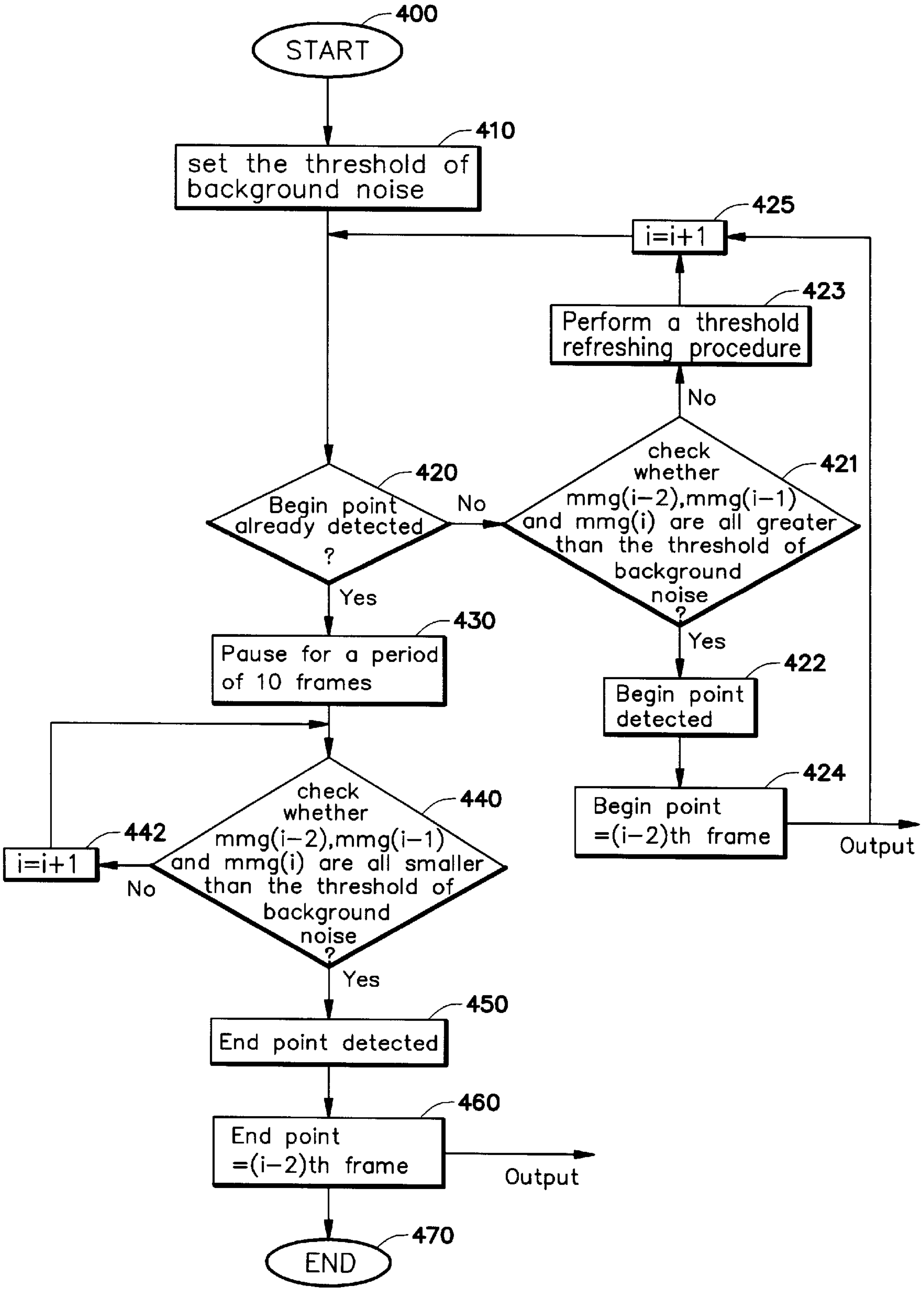
FIG. 4 is a flow diagram showing the procedural steps involved in a begin/end-points detecting procedure for detecting the begin point and end point of the digitized and preemphasized voice signal.

FIG. 4 is a flow diagram showing the procedural steps of an algorithm performed by the begin/end-points detecting circuit 50 to detect the begin point and end point of the preemphasized digital signal based on the majority magnitude of each of the frames in the preemphasized digital signal determined in the foregoing majority magnitude finding procedure of FIG. 3. In the initial step 400, the begin/end-points detecting procedure is started. Then, the next step 410 is to set a threshold of background noise, for example 20. The subsequent step 420 is to check whether the begin point has been detected; if not, the procedure goes to step 421; otherwise, the procedure goes to step 430. The step 421 is to check whether the consecutive mmg(i−2), mmg(i−1), and mmg(i) are all greater than the preset threshold of background noise; if yes, the procedure goes to step 422; otherwise, the procedure goes to step 423. The step 423 is to perform a threshold refreshing procedure in accordance with Eq. (B3). This step allows the threshold of background noise to be adaptively changed based on the environment.

Following the step 423, the subsequent step 425 is to perform the operation i=i+1 to process the next frame; then the procedure goes back to the step 420. If in the step 421 the result is yes, the procedure goes to the step 422 to notify that the begin point is detected. In the subsequent step 424, the (i−2)th frame is taken as the begin point of the voice signal and then the begin/end signal is switched to the enable state.

The procedure then goes to the step 425 perform the operation i=i+1 to process the next frame; then the procedure goes back to the step 420. At this time, the step 420 will determine that the begin point has been detected; therefore, the procedure goes to the step 430, in which the procedure is paused for a period of a predetermined number of frames, for example 10 frames before actually starting the end-point detecting procedure. This provision is due to the fact that a voice signal is usually at least 300 ms in length.

The subsequent step 440 is to check whether all the consecutive mmg(i−2), mmg(i−1), and mmg(i) are all smaller than the preset threshold of background noise. If no, the procedure goes to the step 442 to perform the operation i=i+1 to fetch the next frame; otherwise, if yes, the procedure goes to the step 450 to notify that the end point is found. The subsequent step 460 then takes (i−2)th frame taken as the end point of the voice signal and the begin/end signal is switched to the disable state. The procedure then goes to the step 470 to terminate the procedure.

In conclusion, the invention provides a voice detection method and apparatus for detecting the begin point and end point of a voice signal. In particular, the voice detection method and apparatus of the invention needs no complex multiplication and divisions as in the prior art to perform the computations for the voice detection. Besides, the register used in the voice detection apparatus needs only a bit length of 8 while overflow can be prevented and good results can be nonetheless obtained. Since the voice detection apparatus of the invention needs only to count for the majority magnitude with only an adder, a subtracter, and a shifter, the hardware complexity is significantly reduced compared to the prior art. Moreover, the simplified preemphasis circuit and refreshing procedure for the threshold of background noise can further reduce the hardware complexity, and thus manufacturing cost, of the voice detection apparatus Another advantage of the invention is that the preemphasis circuit can preemphasize the high-frequency and low-amplitude components of the voice signal so as to prevent the loss of fidelity of the voice signal. The preemphasized signal is then processed by the majority-magnitude detecting circuit to obtain the majority magnitude of each of the frames in the voice signal. The simplified architecture of the majority-magnitude detecting circuit allows the overall voice detection apparatus to be reduced in hardware cost.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A voice detection method for detecting whether a preemphasized digital signal is a voice signal, comprising the steps of:

receiving the preemphasized digital signal;

dividing the preemphasized digital signal into a plurality of frames, each frame containing a specific number of sampling points of data;

counting for the total number of occurrences of each of the absolute discrete amplitude levels in each of the frames in the preemphasized digital signal;

finding the majority magnitude of each of the frames in the preemphasized digital signal;

comparing the majority magnitude of each of the frames with a preset threshold of background noise;

if a predetermined number of consecutive frames are all greater in majority magnitude than the threshold of background noise, then switching a begin/end signal to an enable state;

otherwise, maintaining the begin/end signal at a disable state.

2. A voice detection method for detecting whether a received analog signal is a voice signal, comprising the steps of:

digitizing the received analog signal into digital form;

preemphasizing the digital form of the received analog signal to thereby obtain a preemphasized digital signal;

dividing the preemphasized digital signal into a plurality of frames, each frame containing a specific number of sampling points of data;

counting for the total number of occurrences of each of the absolute discrete amplitude levels in each of the frames in the preemphasized digital signal;

finding the majority magnitude of each of the frames in the preemphasized digital signal;

comparing the majority magnitude of each of the frames with a preset threshold of background noise;

if a predetermined number of consecutive frames are all greater in majority magnitude than the threshold of background noise, then switching a begin/end signal to an enable state;

otherwise, maintaining the begin/end signal at a disable state.

3. The method of claim 2, wherein the step of preemphasizing digital form of the received analog signal is performed in accordance with the equation:

$$y(n)=x(n)-\alpha \cdot x(n-1)$$

where y(n) is the (n)th output preemphasized digital signal;

x(n) is the sampled digital data from the (n)th sampling point; and $\alpha$ is a predetermined preemphasizer factor.

4. The method of claim 2, wherein the step of comparing the majority magnitude of each of the frames, if the predetermined number of consecutive frames are not all greater in majority magnitude than the threshold of background noise, then performing a threshold refreshing procedure.

5. The method of claim 4, wherein said threshold refreshing procedure is performed in accordance with the equation to obtain a refreshed new threshold of background noise:

New_Threshold=Old_Threshold+$b$×(Majority_Magnitude−Old_Threshold)

where

New_Threshold is the refreshed new threshold of the background noise;

Old_Threshold is the previously set threshold of background noise;

Majority_Magnitude is the majority magnitude of the currently received frame; and b is a predetermined constant.

6. The method of claim 2, wherein the step of comparing the majority magnitude of each of the frames, after the begin/end signal is switched to the enable state, performing the following the steps of:

pausing for a period of a specific number of frames;

comparing the majority magnitude of each of subsequently received frames with the preset threshold of background noise;

if a predetermined number of consecutive frames are not all greater in majority magnitude than the threshold of background noise, then switching the begin/end signal to the disable state;

otherwise, maintaining the begin/end signal at the enable state.

7. A voice detection method for detecting whether a received analog signal is a voice signal, comprising the steps of:

digitizing the received analog signal into digital form;

preemphasizing the digital form of the received analog signal to thereby obtain a preemphasized digital signal;

dividing the preemphasized digital signal into a plurality of frames, each frame containing a specific number of sampling points of data;

counting for the total number of occurrences of each of the absolute discrete amplitude levels in each of the frames in the preemphasized digital signal;

finding the majority magnitude of each of the frames in the preemphasized digital signal;

comparing the majority magnitude of each of the frames with a preset threshold of background noise;

if a predetermined number of consecutive frames are all greater in majority magnitude than the threshold of background noise, then switching a begin/end signal to an enable state;

otherwise, maintaining the begin/end signal at a disable state, if in said step of comparing the majority magnitude of each of the frames, the begin/end signal being switched to the enable state, performing the following substeps of:

pausing for a period of a specific number of frames;

comparing the majority magnitude of each of subsequently received frames with the preset threshold of background noise;

if a predetermined number of consecutive frames are not all greater in majority magnitude than the threshold of background noise, then switching the begin/end signal to the disable state;

otherwise, maintaining the begin/end signal at the enable state.

8. The method of claim 7, wherein in said step of preemphasizing the digital form of the received analog signal, the preemphasizing is performed in accordance with the equation:

$$y(n)=x(n)-\alpha \cdot x(n-1)$$

where y(n) is the (n)th output preemphasized digital signal;

x(n) is the sampled digital data from the (n)th sampling point; and

α is a predetermined preemphasizeer factor.

9. The method of claim 7, wherein a threshold refreshing procedure is performed in accordance with an equation to obtain a refreshed new threshold of background noise:

$$New\_Threshold=Old\_Threshold+b\times(Majority\_Magnitude-Old\_Threshold)$$

where

New_Threshold is the refreshed new threshold of background noise;

Old_Threshold is the previously set threshold of background noise;

Majority_Magnitude is the majority magnitude of the currently received frame; and b is a predetermined constant.

10. A voice detection apparatus for detecting whether a digital signal converted form an analog input is a voice signal, which comprises:

a preemphasis circuit for preemphasizing the digital signal to thereby obtain a preemphasized digital signal, said preemphasized digital signal being divided into a plurality of frames, each containing a specific number of sampling points of data;

a majority-magnitude detecting circuit, coupled to receive the preemphasized digital signal from said preemphasis circuit, for finding the majority magnitude of each of the frames in the preemphasized digital signal;

a begin/end-points detecting circuit, coupled to said majority-magnitude detecting circuit, capable of comparing the majority magnitude of each of the frames with a preset threshold of background noise in such a manner that:

if a predetermined number of consecutive frames are not all greater in majority magnitude than the threshold of background noise, then said begin/end-points detecting circuit maintaining a begin/end signal at a disable state;

otherwise, said begin/end-points detecting circuit switching the begin/end signal to an enable state, then comparing the majority magnitude of each of subsequently received frames with the preset threshold of background noise in such a manner that:

if a predetermined number of consecutive frames are not all greater in majority magnitude than the threshold of background noise, then said begin/end-points detecting circuit switching the begin/end signal to the disable state;

otherwise, said begin/end-points detecting circuit maintaining the begin/end signal at the enable state.

11. The apparatus of claim 10, further comprising:

a low-pass filter with a specific cutoff frequency for filtering out all frequency components of the analog input beyond the voice frequency range; and an analog-to-digital converter, coupled to said low-pass filter, for converting the output of said low-pass filter into digital form.

12. A voice detection apparatus for detecting whether a received analog signal is a voice signal, which comprises:

a low-pass filter with a specific cutoff frequency for filtering out all frequency components of the analog input beyond the voice frequency range;

an analog-to-digital converter, coupled to said low-pass filter, for converting the output of said low-pass filter into a digital signal;

a preemphasis circuit for preemphasizing the digital signal to thereby obtain a preemphasized digital signal, said preemphasized digital signal being divided into a plurality of frames, each containing a specific number of sampling points of data;

a majority-magnitude detecting circuit, coupled to receive the preemphasized digital signal from said preemphasis circuit, for finding the majority magnitude of each of the frames in the preemphasized digital signal;

a begin/end-points detecting circuit, coupled to said majority-magnitude detecting circuit, capable of comparing the majority magnitude of each of the frames with a preset threshold of background noise in such a manner that:

if a predetermined number of consecutive frames are not all greater in majority magnitude than the threshold of background noise, then said begin/end-points detecting circuit maintaining a begin/end signal at disable state;

otherwise, said begin/end-points detecting circuit switching the begin/end signal to an enable state, then comparing the majority magnitude of each of subsequently received frames with the preset threshold of background noise in such a manner that:

if a predetermined number of consecutive frames are not all greater in majority magnitude than the threshold of background noise, then said begin/end-points detecting circuit switching the begin/end signal to the disable state;

otherwise, said begin/end-points detecting circuit maintaining the begin/end signal at the enable state.

13. The apparatus of claim 12, wherein said preemphasis circuit performs the following arithmetic operation to obtain the preemphasized digital signal:

$$y(n)=x(n)-\alpha \cdot x(n-1)$$

where y(n) is the (n)th output preemphasized digital signal;

x(n) is the sampled digital data from the (n)th sampling point; and

α is a predetermined preemphasizeer factor.

14. The apparatus of claim 13, wherein said preemphasis circuit comprises:

a delay circuit for delaying each digitized sample of data by one unit;

an subtracter for subtracting delayed version of each digitized sample of data from the undelayed version of the same;

a shifter for shifting the bits of the output of said delay circuit by a predetermined number of bits; and an adder for summing up the output of said subtracter and the output of said adder to thereby obtain the preemphasized digital signal.

* * * * *